United States Patent

[11] 3,607,233

| [72] | Inventors | Helmut Maczek |
| | | Duisburg-Buchholz; |
| | | Peter Manthey, Duisburg-Serm, both of |
| | | Germany |
| [21] | Appl. No. | 774,503 |
| [22] | Filed | Nov. 8, 1968 |
| [45] | Patented | Sept. 21, 1971 |
| [73] | Assignees | Metallurgical Processes Limited |
| | | Nassau, Bahamas; |
| | | Imperial Smelting Corporation (N.S.C.) |
| | | Limited |
| | | London, England |
| [32] | Priority | Dec. 1, 1967 |
| [33] | | Great Britain |
| [31] | | 54758/67 |

[54] PURIFICATION OF ZINC
6 Claims, No Drawings

[52] U.S. Cl. .......................................................... 75/86,
75/93 A, 75/94
[51] Int. Cl. ........................................................ C22b 9/00,
C22b 9/10
[50] Field of Search............................................. 75/86, 93,
94, 88, 24, 14

[56] References Cited
UNITED STATES PATENTS

| 1,097,926 | 5/1914 | Koper............................ | 75/93 |
| 2,636,817 | 4/1953 | Knechtel....................... | 75/86 |
| 2,701,194 | 2/1955 | Deterding...................... | 75/24 |
| 3,171,735 | 3/1965 | Gray............................. | 75/24 |
| 3,262,773 | 7/1966 | Fritze........................... | 75/76 |

Primary Examiner—Winston A. Douglas
Assistant Examiner—A. Skapars
Attorney—Holman & Stern ABSTRACT: A method of purifying zinc by removal of arsenic consists of treating the arsenic-containing molten zinc with sodium metal and ammonium chloride and removing the dross formed from the surface of the molten zinc. Preferably a dross-conditioning agent such as sawdust or coke breeze is added before removing the dross. Aluminum may be used in addition to the sodium and ammonium chloride in the purification process.

PURIFICATION OF ZINC

The invention relates to the purification of zinc and more particularly to the removal of arsenic from zinc such as that produced in a zinc blast furnace.

It is known that arsenic is one of the elements volatilized during the precess of smelting zinc in a blast furnace and that this arsenic contaminates the zinc condensed from the blast furnace gases.

It is also known that it is possible to remove arsenic from contaminated zinc by stirring sodium into the molten zinc and removing a sodium/arsenic containing scum from the surface of the molten metal.

The known procedure is to add sodium and sawdust to the molten zinc, either simultaneously or consecutively, to allow it to stand for a brief period and then to skim off the scum or dross from the surface of the molten metal. In this way the arsenic content of the zinc can be reduced from 200–400 ton to about 20 ton. However the scum drawn off also contains a considerable quantity of zinc and this can amount to 1.5 percent to 2 percent of the zinc produced in the furnace. The scum or dross is recirculated through the charge preparation circuit for the blast furnace and therefore represents an undesirable circulating load of zinc.

It has now been discovered that the amount of zinc recirculated can be drastically reduced if ammonium chloride is added to the zinc together with the sodium and a dross-conditioning agent such as sawdust is subsequently added.

This invention consists in a process for the purification of zinc which contains arsenic, which process comprises treating the molten zinc with ammonium chloride and metallic sodium and removing the dross formed from the surface of the molten zinc.

Preferably a dross-conditioning agent is added to the metal, before removing the dross.

Advantageously a small amount of aluminum may be added to the zinc in addition to the sodium at the initial treatment stage.

It is found that by using the modification of the sodium treatment process as described above the output of dross is reduced by about 60 percent, thus considerably reducing the circulating load of zinc in the charge preparation circuit.

The invention will be further described with reference to the following examples in which example A describes the previously known purification procedure and examples B and C the procedure according to this invention.

EXAMPLE A

Zinc from a holding bath fed from a zinc blast furnace condenser is tapped into a ladle of some 2 tons capacity, sticks of sodium (5–10 in number) each of 100 g. weight are added to the zinc, and the molten metal is stirred to ensure good contact between the two metals. When full the metal in the ladle is again stirred, and then some sawdust (about One-half kg.) is added and stirred in; it is then allowed to settle out to the metal surface. The solids accumulating on the surface of the molten metal are removed (with one form or other of perforated "spoon") and rejected as drosses. These drosses contain a high percentage of free metal, which does not drain away from the other solids - sawdust plus oxidic dross - removed in the scoop.

The treated and skimmed zinc is then poured into a liquation bath.

The collected drosses are, together with those deriving from other parts of the plant, returned to the charge preparation circuit of the blast furnace.

EXAMPLE B

About 2.2-ton zinc-containing As, at a temperature of about 480° C., are tapped into a casting ladle of a capacity of about 2.3 ton. This process takes 8–12 minutes. According to the invention, with an As content in the zinc of 0.025 percent, eight sticks, each of 100 g., sodium metal are placed in the bottom of the ladle before tapping, together with about 1 kg. of briquetted ammonium chloride nuts and a shovelful of sawdust. As molten zinc collects in the ladle during the tapping process, the mixture of ammonium chloride and sawdust forms a closed cover over it, unlike the former mode of operation when the mixture of ammonium chloride and sawdust was not used. The sawdust then burns out and part of the ammonium chloride vaporizes. This prevents both the admission of air to the surface of the melt and the cooling of the melt. When the ladle is about one-fourth full, the contents are briefly stirred with a rabble, while the zinc continues to flow in. Immediately after tapping is ended the dross is also stirred and then removed by a perforated skimmer. The amount of dross per ladle is only about 20 kg., as compared with about 58 kg. with the earlier mode of operation.

EXAMPLE C

Zinc from a holding bath is tapped into a ladle of some 2-tons capacity. As soon as the zinc is flowing, sticks of sodium (5–10 in number), about 450 g. of a zinc-aluminum master alloy containing 15 percent of aluminum and ammonium chloride (about one-half kg.) are added and stirred into the flowing metal. When full, sawdust is added and the drossing operation carried out, again with some form of perforated "spoon". It is found that the drosses made by this procedure drain more easily and quickly, so that far less metal is removed with the drosses. A reduction of zinc content of the dross of about 60 percent was achieved in comparison with the procedure of example A.

Various modifications may be made within the scope of the invention. Thus other dross-conditioning agents may replace the sawdust e.g. coke breeze, pulverized fuel ash or some other high surface area material may be used.

We claim:

1. In a process for the removal of arsenic from molten zinc by the addition of sodium and removal of dross, the improvement in combination therewith comprising adding ammonium chloride to the molten zinc, allowing dross to settle out at the surface of the molten zinc and removing the dross from said surface.

2. A process as claimed in claim 1 in which a dross-conditioning agent is added to the metal, before removing the dross.

3. A process as claimed in claim 2, in which the dross-conditioning agent is sawdust.

4. A process as claimed in claim 2, in which the dross-conditioning agent is coke breeze.

5. A process as claimed in claim 2, in which the dross-conditioning agent is pulverized fuel ash.

6. A process as claimed in claim 1, in which the zinc is treated with aluminum in addition to the sodium and ammonium chloride.